(12) United States Patent
Lyatkher

(10) Patent No.: US 7,652,388 B2
(45) Date of Patent: Jan. 26, 2010

(54) WAVE-FLOW POWER INSTALLATION

(76) Inventor: Victor Lyatkher, 563 Bartow Ln., Richmond Hts., OH (US) 44143

( * ) Notice: Subject to any disclaimer, the term of this patent is extended or adjusted under 35 U.S.C. 154(b) by 0 days.

(21) Appl. No.: 12/286,037

(22) Filed: Sep. 26, 2008

(65) Prior Publication Data

US 2009/0091134 A1 Apr. 9, 2009

(30) Foreign Application Priority Data

Oct. 4, 2007 (RU) .............................. 2007136697

(51) Int. Cl.
*F03B 13/10* (2006.01)
*F03B 13/12* (2006.01)
*F03B 13/00* (2006.01)
*F03B 9/00* (2006.01)

(52) U.S. Cl. .............................. 290/53; 290/54; 290/55
(58) Field of Classification Search .............. 290/53–55
See application file for complete search history.

(56) References Cited

U.S. PATENT DOCUMENTS

| 1,399,558 | A | * | 12/1921 | Howe | 416/10 |
| 2,097,286 | A | * | 10/1937 | McGee | 290/54 |
| 3,898,490 | A | * | 8/1975 | Wedman | 310/52 |
| 3,993,913 | A | * | 11/1976 | Dickman | 290/53 |
| 4,001,596 | A | * | 1/1977 | Kurtzbein | 290/53 |
| 4,172,689 | A | * | 10/1979 | Thorsheim | 415/7 |
| 4,241,283 | A | * | 12/1980 | Storer, Sr. | 290/54 |
| 4,256,970 | A | * | 3/1981 | Tomassini | 290/53 |
| 4,383,797 | A | * | 5/1983 | Lee | 415/7 |
| 4,446,378 | A | * | 5/1984 | Martinez Parra | 290/54 |
| 4,636,141 | A | * | 1/1987 | Sedlacek | 416/86 |
| 4,717,832 | A | * | 1/1988 | Harris | 290/43 |
| 4,782,257 | A | * | 11/1988 | Secher et al. | 310/114 |
| 5,117,141 | A | * | 5/1992 | Hawsey et al. | 310/114 |
| 5,440,175 | A | * | 8/1995 | Mayo et al. | 290/54 |
| 5,506,453 | A | * | 4/1996 | McCombs | 290/44 |
| 5,642,984 | A | * | 7/1997 | Gorlov | 416/176 |
| 5,793,136 | A | * | 8/1998 | Redzic | 310/114 |
| 5,882,143 | A | * | 3/1999 | Williams, Jr. | 405/78 |
| 6,036,443 | A | * | 3/2000 | Gorlov | 416/176 |
| 6,049,152 | A | * | 4/2000 | Nakano | 310/114 |
| 6,097,104 | A | * | 8/2000 | Russell | 290/54 |

(Continued)

FOREIGN PATENT DOCUMENTS

RU 2216644 12/2001

(Continued)

*Primary Examiner*—Nicholas Ponomarenko
*Assistant Examiner*—Pedro J Cuevas

(57) ABSTRACT

A wave-flow power installation comprises a float, a convergent-divergent water passage, attached to the float by an arm furnished with a hinge to turn the passage perpendicularly to a water stream, two turbines coaxially mounted in the passage, oriented orthogonally to the stream, each having a shaft oriented across the passage, an end of the shafts is attached to the wall of passage, supplied with hydro-dynamical blades, providing opposite rotation of the turbines, and an electro-generator including two rotors kinematically coupled with the shafts of the first turbines, providing rotation of the rotors in the opposite directions, and a stationary inductor disposed between the rotors. In some embodiments, the electro-generator is enclosed in a cavity of a hermetic capsule. The present invention can be used for building non-polluting power plants on rivers, in coastal areas of sea, and in proximity to platforms for underwater extraction of minerals.

2 Claims, 2 Drawing Sheets

U.S. PATENT DOCUMENTS

| | | | | |
|---|---|---|---|---|
| 6,133,644 | A * | 10/2000 | Smith et al. | 290/53 |
| 6,172,429 | B1 * | 1/2001 | Russell | 290/54 |
| 6,211,597 | B1 * | 4/2001 | Nakano | 310/266 |
| 6,304,017 | B1 * | 10/2001 | Leupold | 310/115 |
| 6,457,436 | B1 * | 10/2002 | Truebe et al. | 119/219 |
| 6,492,743 | B1 * | 12/2002 | Appa | 290/55 |
| 6,710,492 | B2 * | 3/2004 | Minagawa | 310/113 |
| 6,734,576 | B2 * | 5/2004 | Pacheco | 290/55 |
| 6,815,857 | B2 * | 11/2004 | Akatsu | 310/114 |
| 6,867,560 | B2 * | 3/2005 | Arimitsu | 318/144 |
| 7,030,528 | B2 * | 4/2006 | Morgante | 310/112 |
| 7,240,751 | B2 * | 7/2007 | Hoare et al. | 180/65.25 |
| 7,352,074 | B1 * | 4/2008 | Pas | 290/43 |
| 7,540,200 | B2 * | 6/2009 | Yung et al. | 73/807 |
| 7,566,983 | B1 * | 7/2009 | Lyatkher | 290/54 |
| 7,569,970 | B2 * | 8/2009 | Iwata et al. | 310/266 |
| 7,578,126 | B2 * | 8/2009 | Lyatkher | 60/398 |
| 7,586,209 | B1 * | 9/2009 | Lyatkher | 290/54 |
| 2001/0001299 | A1 * | 5/2001 | Gorlov | 440/8 |
| 2001/0049239 | A1 * | 12/2001 | Treaster et al. | 440/38 |
| 2002/0185079 | A1 * | 12/2002 | Truebe et al. | 119/219 |
| 2003/0006614 | A1 * | 1/2003 | Appa | 290/55 |
| 2004/0155554 | A1 * | 8/2004 | Morgante | 310/266 |
| 2005/0017513 | A1 * | 1/2005 | Sipp | 290/54 |
| 2007/0056384 | A1 * | 3/2007 | Yung et al. | 73/807 |
| 2007/0108768 | A1 * | 5/2007 | Dempster | 290/42 |
| 2009/0079196 | A1 * | 3/2009 | Lyatkher | 290/53 |
| 2009/0085356 | A1 * | 4/2009 | Lyatkher | 290/52 |
| 2009/0194997 | A1 * | 8/2009 | Stabins | 290/54 |

FOREIGN PATENT DOCUMENTS

SU        1280178        12/1986

* cited by examiner

US 7,652,388 B2

WAVE-FLOW POWER INSTALLATION

CROSS-REFERENCE TO RELATED APPLICATIONS

This U.S. patent application claims priority under 35 U.S.C. 119(a) through (d) from a Russian Federation patent application No. 2007136697 filed on 4 Oct. 2007.

BACKGROUND OF THE INVENTION

The invention relates to the field of hydro-power engineering, particularly to construction of low-pressure river or wave power installations capable to convert renewable energy of the river flow or water waves.

There is known a hydro-turbine installation comprising two turbines disposed horizontally and coaxially to each other and mounted in a water passage, and an electro-generator (see Inventor Certificate SU No 1280178 issued Dec. 30, 1986).

In the given power installation, the turbines include coaxial shafts that are oriented along the water passage and connected by a gear capable to multiply the speed of rotation. The gear is located in a hermetic capsule in the center of the water passage, and is coupled with a vertical shaft of the electro-generator mounted outside of the water passage. However, such design results in low efficiency of energy conversion of the water stream passing through a cross-section of the water passage. It is caused by the fact that the turbines, in this case of a propeller type, operate sequentially, taking turns, depending on a direction of the stream, and that the capsule with the gear in part overlaps the work water flow directed along the shafts of turbines.

The closest prior art to the present invention in terms of its structure and achievable result is a power installation, comprising two orthogonal turbines having blades of a hydrodynamic profile, which turbines are horizontally and coaxially mounted in a convergent-divergent water passage, and an electric generator. The turbines are made orthogonal and cross-jet, their shafts are oriented across the water passage of the installation; one the end of each shaft of the turbines is fixed in the wall of the water passage; the electro-generator is located between the orthogonal turbines, kinematically connected to the shafts and located in a hermetic cavity (see Patent RU No 22216644, issued Nov. 20, 2003).

However the design of the aforesaid power installation represents, in essence, a stationary power installation, which can be floatably delivered to the place of exploitation with the subsequent attachment to the bottom of the water reservoir, for example, in a coastal zone of sea or ocean, or on the bottom of a river, and then operate in a stationary mode. This circumstance narrows the scope of its use. Besides, the design of electro-generator with the through shaft, connecting the shafts of orthogonal turbines, does not allow efficient conversion of energy of the water stream into electric power.

BRIEF DESCRIPTION OF THE INVENTION

The present invention is directed to solving a problem of broadening the functional capacities of hydro-power installations. The inventive solution allows increasing efficiency of energy conversion of a water stream passing through a flow part of a convergent-divergent water passage.

The specified problem is solved, and the result is attained due to a special design of the inventive wave-flow power installation comprising: a float, a water passage of a convergent-divergent shape, the passage is attached to the float by means of an arm furnished with a hinge allowing the passage to turn for orientation perpendicularly to a water stream; a first turbine and a second turbine coaxially mounted in the passage and oriented orthogonally to the water stream in the passage, the turbines are supplied with blades of a hydrodynamical profile, the blades being so oriented that provide rotation of the turbines in the opposite directions, the turbines each having a shaft oriented across the passage, one end of each shaft of the turbine is attached to the wall of the passage; and an electro-generator including a first rotor being kinematically coupled with the shaft of the first turbine, and a second rotor being kinematically coupled with the shaft of the second turbine, providing rotation of the rotors in the opposite directions, and a stationary inductor of bilateral action disposed between the rotors. The rotors may be preferably performed, for example, short-circuited having a predeterminedly small clearance with the inductor, and supplied with a corresponding insertion made of material with low sliding friction. Generally, the electro-generator can be mounted without its enclosing in a hermetic capsule, though in some embodiments this may be preferable.

An opportunity to extend functional capacities of hydro-power installations with orthogonal turbines has been revealed during research, due to hingedly mounting the passage with the orthogonal turbines and the electro-generator under water on the arm attached to the float. The invention allows removing any restrictions on the relief of the water reservoir bottom in the location of the power installation. There is no necessity for works of preparation of the reservoir's bottom for mounting the power installation on the site. The deployment of the arm with the hinge allows turning and fixing the passage in the direction of the water stream and using the inventive installation as a flow power installation or as a wave power installation.

Additional opportunities to increase the generation of electric energy are also attained due to arrangement of the blades oriented for rotation in the opposite directions that causes the opposite rotation of the turbines orthogonally positioned in relation to the water stream in the passage irrespective of the direction of the stream, and due to arrangement of the inductor between the two rotors of the generator, which allows generating electrical power in the inductor by the water stream flowing in either direction in the passage. The design of the rotors short-circuited having a predeterminedly small clearance with the inductor and supplied with a corresponding insertion made of material with low sliding friction allows further increasing the power generation.

Figure 1:
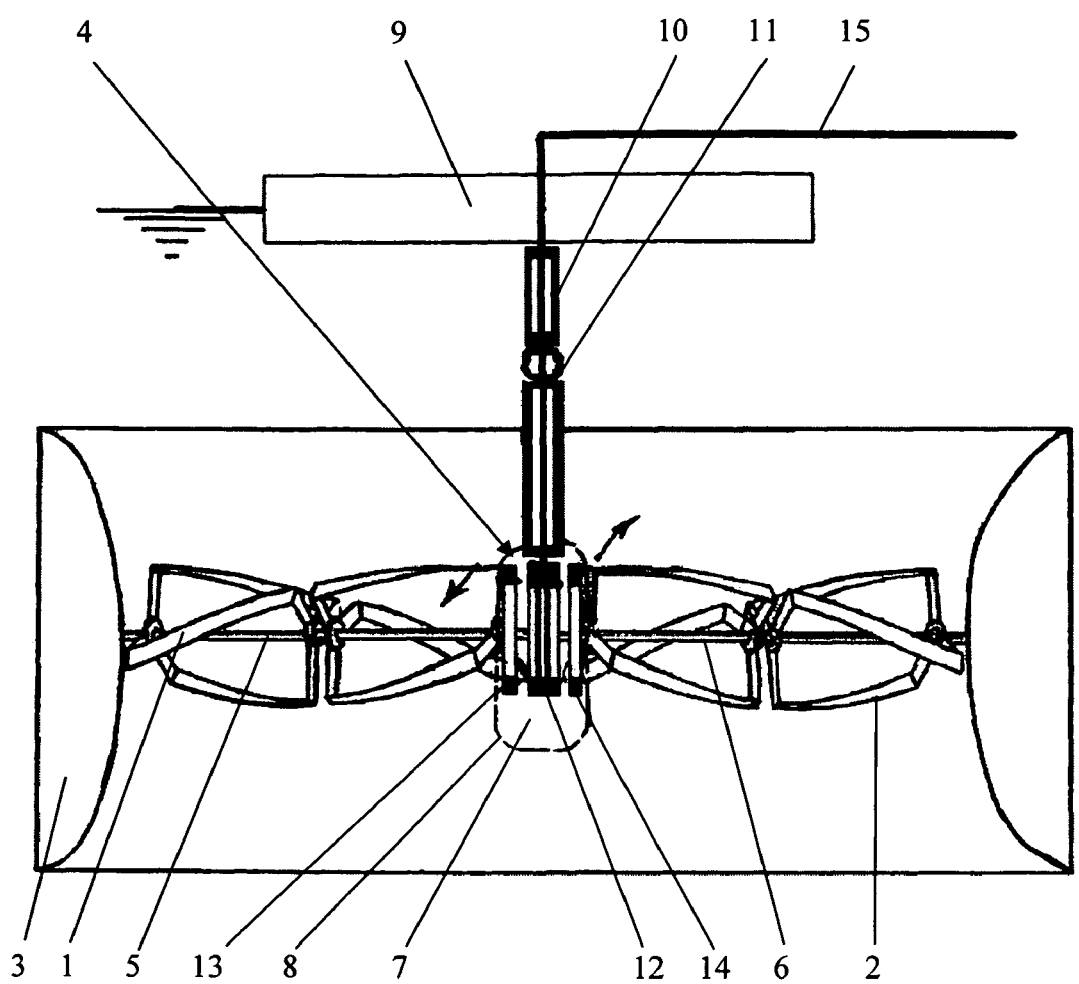
FIG. 1 shows a schematic view of the wave power installation wherein the water passage is mounted vertically, according to a preferred embodiment of the present invention.
Figure 2:
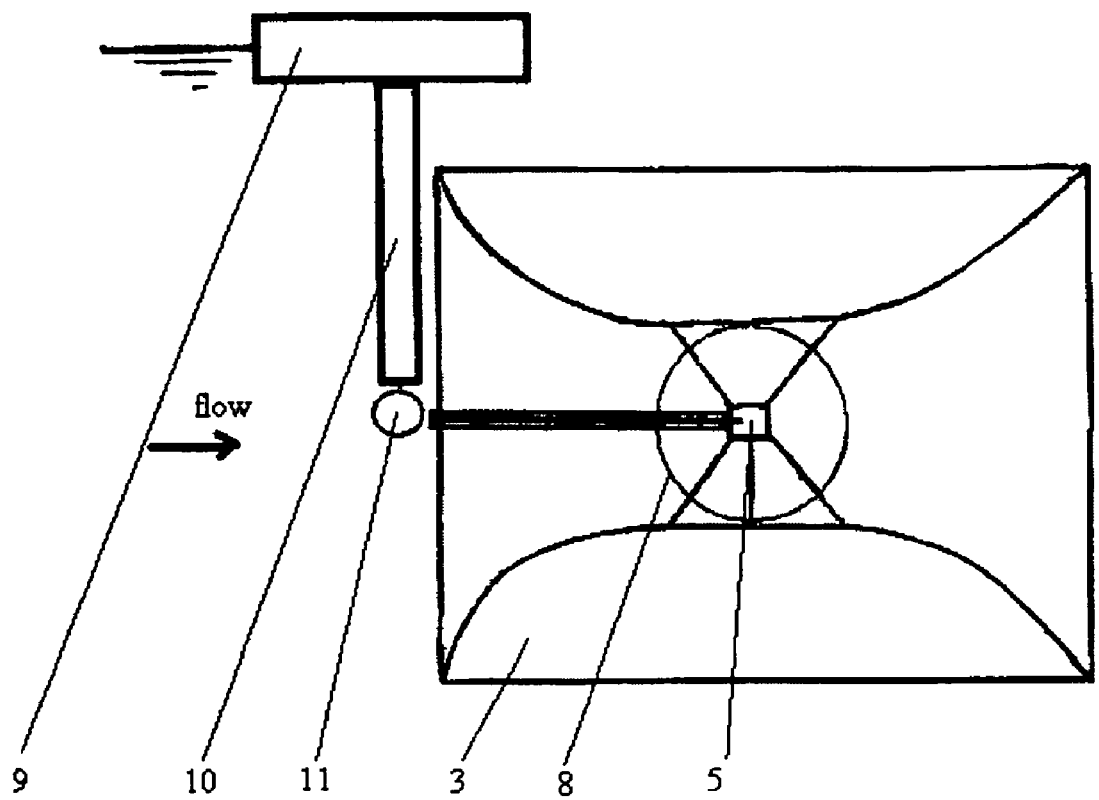
FIG. 2 shows a schematic view of the wave power installation wherein the water passage is mounted horizontally, according to another preferred embodiment of the present invention.

Each reference numeral indicated on FIGS. 1 and 2 is designated to an element of the inventive structure described herein below. A first time introduced reference numeral in the description is enclosed into parentheses.

DETAIL DESCRIPTION OF PREFERRED EMBODIMENTS OF THE INVENTION

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

In preferred embodiments, the inventive wave-flow power installation comprises: a float (9), a water passage (3) of a convergent-divergent shape, the passage 3 is attached to the float 9 by means of an arm (10) furnished with a hinge (11) allowing the passage 3 to turn for orientation perpendicularly to a water stream; a first turbine (1) and a second turbine (2) coaxially mounted in the passage 3 and oriented orthogonally to the water stream in the passage, the turbines 1 and 2 are supplied with blades of a hydro-dynamical profile, the blades being so oriented that provide rotation of the turbines 1 and 2 in the opposite directions, the turbine 1 includes a shaft (5) and the turbine 2 includes a shaft (6) oriented across the passage 3 (horizontally for the embodiment shown on FIG. 1 and vertically for the embodiment shown on FIG. 2), one end of the shafts 5 and 6 is attached to the wall of the passage 3; and an electro-generator (4) including a first rotor (13) being kinematically coupled with the shaft 5, and a second rotor (14) being kinematically coupled with the shaft 6, providing rotation of the rotors 13 and 14 in the opposite directions, and a stationary inductor (12) of bilateral action disposed between the rotors 13 and 14. The rotors are preferably performed short-circuited having a predeterminedly small clearance with the inductor 12, and supplied with a corresponding insertion (not illustrated) made of material with low sliding friction. The electric energy generated by the electro-generator 4 is transmitted via a cable (15) to the place of consumption. Generally, the electro-generator can be mounted without its enclosing in a hermetic capsule, but in some embodiments, requiring higher reliability, this may be preferable. In the embodiment shown on FIG. 1, the electro-generator 4 is enclosed into a cavity (7) contained in a hermetic casing (8).

Operation of the Preferred Embodiments

The wave-flow energy installation with the passage 3 being disposed vertically (as illustrated on FIG. 1) operates as follows: the installation moves together with the sea waves upwards and downwards, a water stream is created through the passage 3 that causes rotation of the turbines 1 and 2. This rotation is transferred to the shafts 5 and 6, and further to the rotors 13 and 14. As a result of rotation of the rotors 13 and 14 in relation to the inductor 12, the electro-generator 4 generates electric energy, which is transmitted via the cable 15 to the place of consumption.

The wave-flow energy installation with the passage 3 being disposed horizontally (as illustrated on FIG. 2) operates as follows: the passage 3 of the wave-flow power installation is set horizontally with the help of the hinge 11. The installation is set up, for example, on a river. Under the action of a river stream, the passage 3 is automatically positioned along the stream. Further, the operation of the wave-flow power installation is similar to the one described above for the vertical disposition of the passage. The stream, proceeding through the passage 3 causes rotation of the turbines 1 and 2 and, accordingly, the rotors 13 and 14 revolve in relation to the inductor 12. Electric energy is generated in the inductor 12 that is transmitted through the cable 15 to the place of consumption.

The present invention can be used for building non-polluting power plants on rivers, in coastal areas of sea, and in proximity to platforms for underwater extraction of minerals.

I claim:

1. A wave-flow power installation comprising:
    a float,
    a water passage of a convergent-divergent shape, the passage is attached to said float by means of an arm furnished with a hinge allowing said passage to turn for orientation perpendicularly to a water stream;
    a first turbine and a second turbine coaxially mounted in said passage and oriented orthogonally to the water stream in said passage, the turbines are supplied with blades of a hydro-dynamical profile, the blades being so oriented that provide rotation of the turbines in the opposite directions, the turbines each having a shaft oriented across the passage, one end of each shaft of the turbine is attached to the wall of the passage; and
    an electro-generator including
        a first rotor being kinematically coupled with the shaft of the first turbine, and a second rotor being kinematically coupled with the shaft of the second turbine, providing rotation of the rotors in the opposite directions, and a stationary inductor of bilateral action disposed between the rotors.

2. The wave-flow power installation according to claim 1, wherein said electro-generator is enclosed in a cavity of a hermetic capsule.

* * * * *